April 21, 1931. J. RINGS 1,802,068
MULTISTORIED BUILDING
Filed June 18, 1927
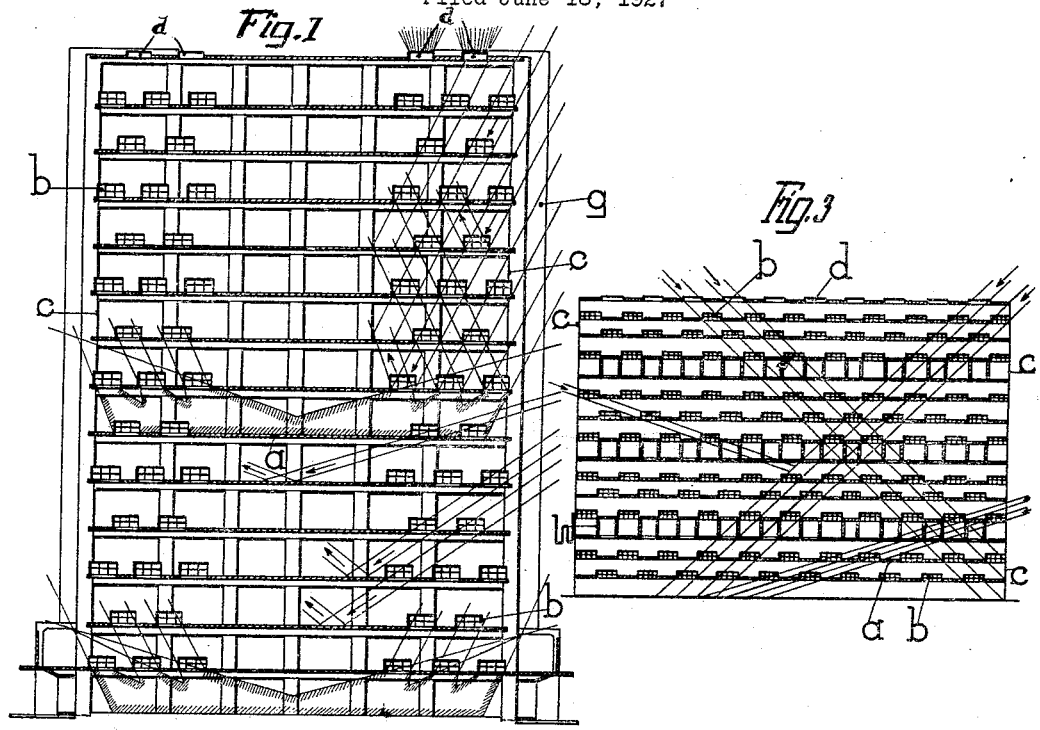
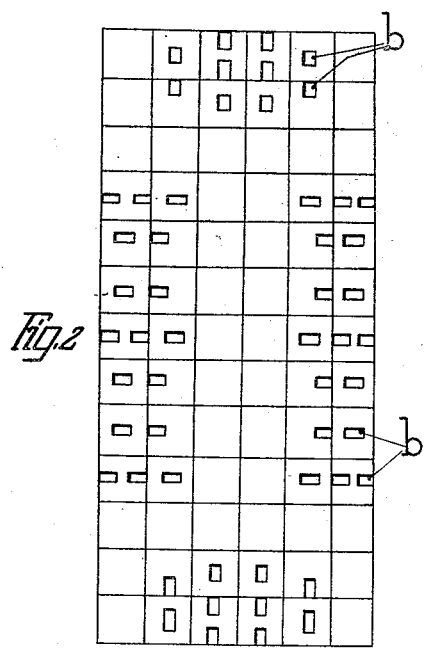
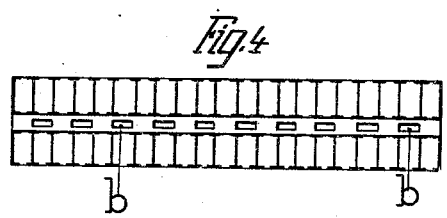
Witnesses: Inventor:

Patented Apr. 21, 1931

1,802,068

UNITED STATES PATENT OFFICE

JOSEF RINGS, OF HANSAHAUS, ESSEN, GERMANY

MULTISTORIED BUILDING

Application filed June 18, 1927, Serial No. 199,819, and in Germany June 21, 1926.

My invention relates to improvements in multi-storied buildings, and the object of the invention is to devise means for distributing more efficiently the daylight entering the building through the windows and skylights.

A further object is to provide means whereby the beams of daylight entering the building through the windows of one floor or through the skylights at the top of the building will be permitted to penetrate to one or more floors therebelow.

My invention consists of a building constructed and arranged all as hereinafter more particularly described and illustrated in the accompanying drawing in which:—

Fig. 1 represents a vertical section through a building constructed according to my invention.

Fig. 2 is a horizontal section therethrough.

Figs. 3 and 4 are vertical and horizontal sections respectively illustrating the lighting of long mezzanine or middle floors according to my invention.

In carrying out my invention I provide light openings $b$ extending through the floors $a$ of the building $g$. Thus the beams of daylight entering the building through the windows $c$ or skylights $d$ penetrate through the light openings $b$ to a floor below, thus lighting such floor. It is conceivable that provided the openings $b$ are in the required position such light beams coming in through the window or skylight openings might pass through the light openings $b$ and light the lowermost floors of the building.

If so desired the partition walls may be provided with light openings so that the beams of light can pass through the walls as well as through the floors.

I preferably arrange the light openings $b$ in adjacent floors in staggered relation to each other so that the light will not pass down in a vertical direction through successive floors, as I only intend the slanting beams of light from the windows or skylights to pass through the light openings.

Furthermore where desired I can provide glass or other translucent walls $w$ around the light openings $b$ in order to partition such openings off.

The light openings can be covered with ordinary glass or with means for reflecting the light such as prisms.

From the above description it will be apparent that a building constructed according to my invention with a comparatively small number of small light openings will be adequately lighted in all rooms and floors, even though the building has a very large floor area and many floors. The following example will illustrate the benefit of my construction:—

In the ordinary construction with a floor area of $40 \times 87$ metres $= 3480$ sq. metres, and a lighting area of, for instance $2 \times 27 \times 13$ metres $= 720$ sq. metres (approximately 20% of the floor area) the height of the building could only be 30 metres to secure proper lighting, whereas with my construction with a building of unlimited height and 3500 sq. metres floor area and with a light opening area of $54 \times 1.50 \times 2.20$ metres $= 178$ sq. metres (5% of the floor area) the building would be correspondingly lighted.

The invention is especially adapted for all buildings where the floors need not be completely separated from each other and where a view from one floor to another is frequently desired, as, for instance, in work shops, offices and administration buildings, department stores, warehouses, exhibition buildings with several stories, as well as for long mezzanine floors. The openings are so arranged in staggered relation as to afford only an oblique view from a height through numerous floors, while a direct view through an opening is possible only to the next floor so as to prevent a possible feeling of dizziness by not allowing a direct view down into the depth. The floor openings can be used in connection with staircases and permit the building in of stairways in any desired number, without further limitation of the useful floor space. Consequently, the present arrangement permits of a much more favorable utilization of the floor spaces, while at the same time supplying the interior of the building to a greater extent with light than heretofore possible.

What I claim as my invention is:

1. In a multi-storied building, the combination with the outer shell of the building having light openings, of storey floors having light openings therethrough, said respective light openings in shell and floors being so positioned relatively to each other as to pass the beams of light entering through the light openings in the shell of the building through the light openings in the floors in an oblique direction into a selected storey.

2. In a multi-storied building, the combination with the outer shell of the building having light openings, of storey floors and partition walls having light openings therethrough, said respective light openings in shells, floors and partitions being so positioned relatively to each other as to pass the beams of daylight entering the building through the light openings in the floors and partition walls in an oblique direction into a selected storey.

3. In a multi-storied building, the combination with the walls having window openings, of storey floors having light openings therethrough, said respective windows and floor light openings being so positioned relatively to each other as to pass the beams of daylight entering the building through the window openings in an oblique direction through such light openings in the floors into a selected storey.

4. In a multi-storied building, the combination with the walls having window openings, of storey floors and partition walls having light openings therethrough, said respective window, floor and partition light openings being positioned relatively to each other as to pass the beams of daylight entering the building through the window openings through such light openings in the floors and partition walls in an oblique direction into a selected storey.

5. In a multi-storied building, the combination with the outer shell of the building having light openings, of storey floors having light openings therethrough, said respective shell and floor light openings being so positioned relatively to each other as to pass the beams of light entering through the light openings in the shell of the building through the light openings in the floors in an oblique direction into a selected storey, the light openings through adjacent floors being placed in staggered relation to each other.

6. In a multi-storied building, the combination with the outer shell of the building having light openings, of storey floors and partition walls having light openings therethrough, said respective shell, floor and partition light openings being so positioned relatively to each other as to pass the beams of daylight entering the building through the light openings in the floors and partition walls in an oblique direction into a selected storey, the light openings in the floors and partition walls of the adjacent stories being placed in staggered relation to each other.

7. In a multi-storied building, the combination with the walls having window openings, of storey floors having light openings therethrough, said window and floor light openings being positioned relatively to each other as to pass the beams of daylight entering the building through the window openings in an oblique direction through such light openings in the floors into a selected storey, the light openings in adjacent floors being placed in staggered relation to each other.

8. In a multi-storied building, the combination with the walls having window openings, of storey floors and partition walls having light openings therethrough, said window, floor and partition light openings being so positioned relatively to each other as to pass the beams of daylight entering the building through the window openings in an oblique direction through such light openings in the floors and partition walls into a selected storey, the light openings in the floors and partition walls of adjacent stories being placed in staggered relation to each other.

9. A multi-story building having light openings provided in the walls and floor thereof with the openings of adjacent floors arranged in staggered relation to afford only an oblique view through successive floors, said openings permitting rays of light to pass interiorly of the building and through successive floors in an oblique direction.

JOSEF RINGS.